Patented Dec. 14, 1937

2,101,984

UNITED STATES PATENT OFFICE

2,101,984

TREATMENT OF CELLULOSE ESTERS TO RENDER SUITABLE FOR MOLDING

Frederick R. Conklin and Charles L. Fletcher, Kingsport, Tenn., assignors, by mesne assignments, to Eastman Kodak Company, Jersey City, N. J., a corporation of New Jersey No Drawing. Application July 3, 1936, Serial No. 88,834

6 Claims. (Cl. 260—102)

The present invention relates to a process of treating a scrap organic acid ester of cellulose, especially cellulose acetate, to adapt it for use in molding compositions.

In the preparation of cellulose esters, a considerable amount of scrap material accumulates both in the processing of the acetate and as waste from the finished product. For instance, in the washing of the ester there may be fine particles thereof in the wash water which remain behind the bulk of the acetate. Also after the ester is dissolved, it may be run through filtering cloths, which cloths become saturated with the ester. In the making of products such as film or yarn, scrap materials will result. Also in the use of cellulose esters for film, some of the film finds its way back in the form of scrap which it is desirable to utilize. Cellulose esters, which do not quite measure up to the high standards which are set for the preparation of products such as yarn, may be scrapped and this material may be employed in our process. Any other source of scrap acetate may be depended upon including even acetate of high grade, which is above normal requirements for an industrial product, and must therefore be diverted to some other use. Therefore, the object of our invention is to prevent the wasting of any cellulose acetate which is scrapped either in the manufacture of film or yarn therefrom or after the yarn or film has been used and then scrapped.

We have found that if scrap cellulose esters, such as of ordinary commercial cellulose acetate, is treated first with a solution of sulfuric acid in glacial acetic acid and subsequently with an aqueous acetic acid bath that a product is obtained which is eminently suited for use in the preparation of molding compositions, especially for the preparation of products which are to be darkly colored, such as black spool heads, cores for cine film, injection molded articles, or the like. The effect of our treatment upon the cellulose acetate is to decrease its precipitation value, which results in an increased flow thereby adapting the material to molding purposes.

Our process comprises a two-step method of treatment in the first step of which the cellulose ester is dissolved in glacial acetic acid, and sulfuric acid in the form of its solution in glacial acetic acid is added thereto and the temperature is elevated and maintained for a time. The second step of the process involves adding aqueous acetic acid to the solution resulting from the first step and allowing the mass to stand until a product having the desired properties is obtained. The ester is then precipitated out, washed and dried and then employed in making a molding composition. If the precipitated ester is not in a sufficiently comminuted form, it may be ground to a finely divided condition. The first step of our process is carried out at a temperature of 90–150° F. It is desired that the temperature be around 130° F. as at temperatures below 100° F., the action proceeds very slowly while at too high a temperature, control is difficult and may result in spoiling the material being processed. The proportion of solvent, which is employed to dissolve the cellulose ester prior to adding the sulfuric acid thereto, may range from 1½–7 parts of the glacial acetic acid to one part of the ester. The amount of solvent which it will be necessary to employ will depend upon the viscosity of the ester which is dissolved. If the ester is of particularly high viscosity, obviously a fairly high proportion of solvent will be desirable. With the ordinary type of scrap acetate, a proportion of 2.4–2.7 parts of solvent to every part of ester has been found to be satisfactory and is preferred in ordinary operation.

The proportion of sulfuric acid to ester employed in the first step is ¾–2%, the proportion depending upon the severity of treatment which is desirable. During the second step, the proportion of sulfuric acid to the ester may be ⅛–2%. It is prefered in practice to neutralize part of the sulfuric acid before the second step, except in those cases in which a small proportion of sulfuric acid was employed in the first step. Even in that case, it is, as a rule, desirable to reduce the sulfuric acid content of the bath employed in the second step. The amount of water present in the bath employed in the second step may be 30–70% of the total weight of the ester which is being treated. By this means the precipitation value is reduced to approximately 60–70% or, if desired, even lower and thereby a cellulose ester is obtained having good flow characteristics so that it is suitable for molding operations.

The following examples illustrate the treatment of scrap cellulose acetate in accordance with our invention:

*Example 1.*—50 pounds of a mixture of dried cellulose acetate, resulting from the washings of film type and yarn type acetates as well as other miscellaneous types, were dissolved in 100 pounds of glacial acetic acid by stirring and heating to 120° F. 160 cc. of 95% sulfuric acid dissolved in 50 pounds of glacial acetic acid was then added and the heating and mixing were continued until the acetic acid-tetrachlorethane viscosity had dropped to approximately 50 seconds. 50 pounds of 50% acetic acid was then slowly added and the mass was brought to 100° F. at which temperature it was maintained until a sample of ester exhibited a precipitation value within the range of 60–70%. The ester was then precipitated by pouring the solution in an excess of water. The resulting product was then washed and dried and comminuted for use in a molding composition. The product was found to be well adapted for this purpose having characteristics equivalent to like materials prepared directly from fresh cellulose acetate. The ester had a viscosity of less than 15 seconds (4:1 acetone), a precipitation value of 60–70% and it was neutral, and stable to the effects of heat.

*Example 2.*—1350 pounds of scrap celulose acetate were dissolved in 2700 pounds of glacial acetic acid while heating up to 130° F. It required about five hours to dissolve the acetate in the acetic acid. 3500 cc. of 96% sulfuric acid dissolved in 675 pounds of glacial acetic acid was added and the temperature was maintained at 130° F. for approximately 2½ to 3 hours. The viscosity had fallen to 100 seconds (acetic acid-tetrachlorethane). 1200 pounds of 50% acetic acid containing 17 pounds of sodium acetate tri-hydrate was then added over a period of 1–3 hours. The temperature was then lowered to 100° F. and maintained for approximately 120 hours or until a product having the desired precipitation value was obtained. The following tabulation gives an analysis of the ester before and after treatment:

|  | Original scrap | Treated scrap |
|---|---|---|
| Viscosity in acetone | 68 secs. | 11 |
| Precipitation value | 79. | 68. |
| Acidity | No | No |
| Moisture | .6% | .4% |
| Dirt count | 11 | 1 |
| Color | Bad | 400 ppm |
| Haze | Bad | 400 ppm |
| Heat test | 6 | 8 |
| Softening point | 250° C. | 245° C. |
| Charring point | 300° C. | 300° C. |

Not only is our method of treating scrap cellulose esters useful for the treatment of cellulose acetate but it is also applicable for the conversion of other esters to a low precipitation value so that they may be employed in molding compositions. Some of the esters which may be employed in our process are cellulose acetate propionate, cellulose acetate butyrate as well as the simple cellulose esters of propionic or butyric acid. In some cases, the original material to be treated may have been subjected to a treatment equivalent to the first step of the process which we have described and in that case it would only be necessary to subject such material to the second step of our process in order to obtain a product having the desired precipitation value and characteristics.

Although where a material having a bad coloration is employed, the resulting product would preferably be used only for colored molded products unless some bleaching had been applied thereto, the material prepared in accordance with our invention, if from a scrap material having a good color, may be employed for colored products regardless of the color desired. It may be seen by reference to the tabulation under the second example that our process exerts a refining effect upon the cellulose ester as shown by the fact that the color haze and dirt count are greatly improved by our process. Molding compositions may be made from this material after it has dried by comminuting it and, if desired, incorporating a plasticizer therein prior to the molding operation. The cellulose ester may be subjected to a precipitation method such as described in U. S. Patent No. 1,991,115, of Northrup and Crane to give it a physical form suitable for use in a molding composition. The product of our invention may be employed for any purpose in which a low precipitation value cellulose acetate is desired. For instance, it may find use in lacquer compositions or in compositions employed for coating fabrics, threads, or the like. Various other uses will suggest themselves from time to time as the art develops.

We claim as our invention:

1. A process for preparing an organic acid ester of cellulose having a precipitation value of approximately 60–70% which comprises subjecting an organic acid ester of cellulose to the action of ¾–2% of sulfuric acid at 90–150° F. in its acetic acid solution in which the acetic acid is 1½–7 times the amount of the ester and then treating the product with a bath containing water in an amount 30–70% of the weight of the ester and an amount of sulfuric acid ⅛–2% of the weight of the ester until a precipitation value of 60–70% is reached.

2. A process for preparing a cellulose acetate suitable for molding purposes which comprises subjecting cellulose acetate to the action of ¾–2% of sulfuric acid based on the weight of the ester at a temperature of 90–150° F. in its solution in 1½–7 parts of glacial acetic acid to every part of the ester and then subjecting the ester to treatment in a bath containing 30–70% of water and ⅛–2% of sulfuric acid based on the weight of the ester at a temperature of approximately 100° F. until a product having a precipitation vale of 60–70% is obtained.

3. A process for preparing cellulose acetate suitable for molding purposes from scrap cellulose acetate which comprises subjecting the ester to the action of a bath containing ¾–2% of sulfuric acid and 150–700% of glacial acetic acid based on the ester at a temperature of 90–150° F. and then subjecting the ester to the action of a bath containing 30–70% water and ⅛–2% of sulfuric acid based on the ester at a temperature of approximately 100° F. until a product having a precipitation value of 60–70% is obtained.

4. A process for preparing a cellulose acetate adapted for molding which comprises dissolving scrap cellulose acetate in an excess of glacial acetic acid adding thereto a solution of sulfuric acid in glacial acetic acid, the sulfuric acid being ¾–2% of the cellulose ester, maintaining the temperature at approximately 130° F. and then adding aqueous acetic acid thereto so that the water present is 30–70% and the sulfuric acid is ⅛–2% of the cellulose ester and maintaining at a temperature of approximately 100° F. until a product having a precipitation value of approximately 60–70% is obtained.

5. A process for preparing a cellulose acetate adapted for molding which comprises dissolving scrap cellulose acetate in an excess of glacial acetic acid adding thereto a solution of sulfuric acid in glacial acetic acid, the sulfuric acid being ¾–2% of the cellulose ester, maintaining the temperature at approximately 130° F. and then adding aqueous acetic acid containing a small amount of sodium acetate thereto so that the water present is 30–70% and the sulfuric acid is ⅛–2% of the cellulose ester and maintaining at a temperature of approximately 100° F. until a product having a precipitation value of approximately 60-70% is obtained.

6. A process for preparing a cellulose acetate suitable for molding purposes which comprises subjecting cellulose acetate to the action of ¾-2% of sulfuric acid in solution in 2.4-2.7 parts of glacial acetic acid, both based on the weight of the cellulose acetate at a temperature of 90°-150° F. and then subjecting the ester to treatment in a bath containing 30-70% of water and ⅛-2% of sulfuric acid based on the weight of the ester, at a temperature of approximately 100° F. until a product having a precipitation value below 70% is obtained.

FREDERICK R. CONKLIN.
CHARLES L. FLETCHER.